July 4, 1944.  R. AVIGDOR  2,352,881
MEANS FOR MOUNTING INSTRUMENTS IN THEIR CASINGS
Filed June 10, 1942

Patented July 4, 1944

2,352,881

UNITED STATES PATENT OFFICE 2,352,881

MEANS FOR MOUNTING INSTRUMENTS IN THEIR CASINGS

Rifat Avigdor, Toronto, Ontario, Canada

Application June 10, 1942, Serial No. 446,547
In Canada April 27, 1942

5 Claims. (Cl. 73—110)

This invention relates to means for mounting instruments in their casings and particularly casings of frangible material such as molded plastic material fibre or the like.

The invention may conveniently be illustrated by general reference to a fluid responsive pressure instrument which will be referred to as a general example in the following specification.

In the mounting of fluid pressure instruments in airtight casings, it has been usual to employ a casing of frangible material, molded plastic material by which I mean material such as Bakelite, etc., which is ordinarily durable and will withstand compressive stress although liable to fracture when subjected to a tension stress. It has also been the practice to mold in the bottom of the case a bushing, nipple or the like which is usually formed with internal threads for connecting therewith a fluid pressure tube fitting or the like. Such a connection must be tightly fitted as the fitting must be proof against ingress of fluid other than that conducted through the tube if employed and must also prevent egress of the fluid from the tube before it reaches the casing. To assure a tight fit between the tube of the bushing, nipple or the like, it has been usual to tighten the fitting by way of a wrench or similar tool, thus subjecting the case to a tension stress through the bushing which is not readily withstood by such frangible material. Moreover, in the case of such a tightening operation, not only is the case subjected to a tension stress but very often the tightening operation tends to twist the bushing, thus subjecting the casing to a compound stress directed also at an angle to the plane of the casing wall which is most injurious. The result of this is that the cases of many instruments are cracked in the final connecting operation, thus rendering such instruments inaccurate and useless.

Apart from this serious disadvantage, the molding of a bushing, nipple or the like in the wall of a case of this kind presents a complication in manufacture which it is advantageous to avoid.

It is an object of the present invention to avoid the disadvantages of this prior practice by producing a means for mounting instruments in frangible cases such as plastic material, etc., which avoids subjecting the cases to a compound tension stress under all conditions, and which may be designed entirely to avoid subjecting the cases to tension stress.

A further object of the invention is to provide a means for mounting instruments in their cases which may only subject the case to a compression stress readily withstood by materials of the kind in question.

A still further object of the invention is to provide a particularly simple and compact type of mounting which will cooperate efficiently with instrument parts and which may be manufactured and assembled very readily.

A still further object of the invention is to provide a means of mounting instruments in casings which will provide for the connection of a conduit therewith placed in communication with the interior of the casing, and wherein means may be provided for avoiding the transmission of tension stresses to the casing in connecting said conduit therewith.

With these and other objects in view the invention generally comprises mounting means connected with the instrument mechanism for mounting the latter on a wall on the inside of the casing and a securing member having a bearing surface of substantial area designed for bearing engagement with the outside of said wall and disposed over an area thereof substantially corresponding to but opposite to that engaging said mounting means, connecting means being provided extending through said wall between the mounting means and securing member subjecting the casing to compressive stress only and equally distributed over a substantial area of the wall. Preferably the wall is recessed on the outside to receive the securing member and the latter is preferably provided with an exteriorly projecting boss or bosses that may be engaged by tools to avoid subjecting the casing to the smallest degree of tension stress in subsequent connecting operations.

The invention will be understood by reference to the following detailed specification taken in conjunction with the accompanying drawing.

In the drawing—

Figure 1:
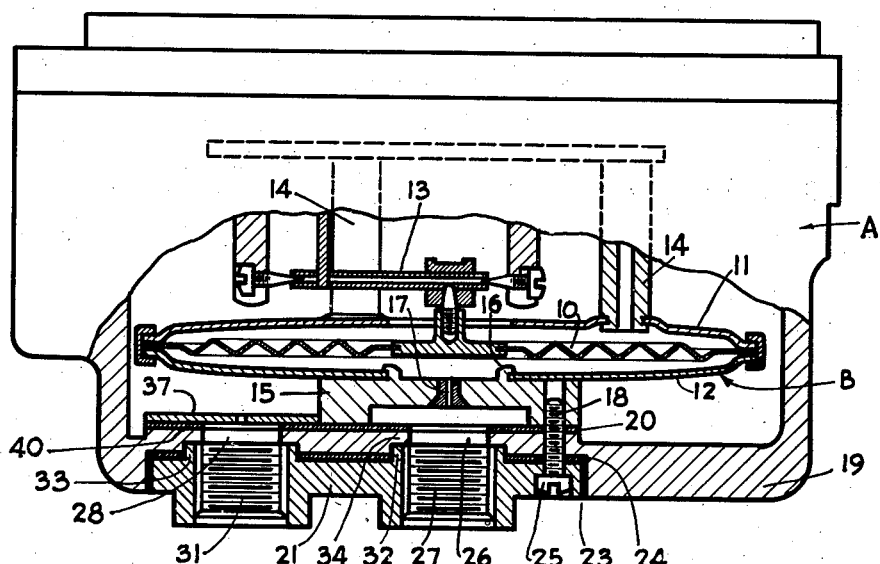
Fig. 1 is a partly sectional view of an instrument casing illustrating a type of instrument mechanism and the manner in which it is mounted and secured in the casing according to the present invention.
Figure 2:
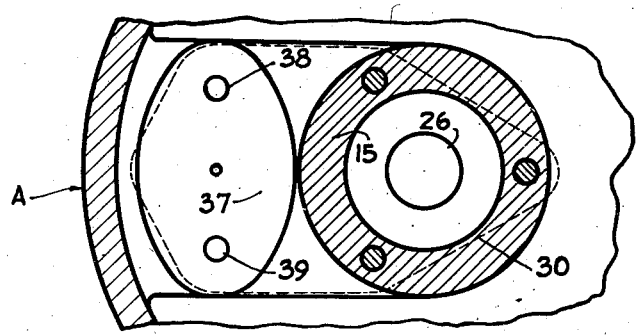
Fig. 2 is a fragmentary plan view of an interior wall of the casing showing the relative position of a securing member on the outside of the wall and a clamping plate employed on the inside of the wall.

Referring to the drawing, A indicates any suitable casing for an instrument which usually is formed from a frangible material such as molded plastic material, Bakelite, or fibrous material, the walls of which will fracture or crack when subjected to a tension stress of a given degree. For the purpose of illustrating the invention, a pressure measuring instrument has been illustrated which is operated by means of a fluid pressure responsive unit B employing a diaphragm 10 clamped between the plate-like casing members 11 and 12 which are fastened in airtight engagement with the diaphragm. The diaphragm is in operative connection with other mechanical parts of the instrument including a lay shaft 13, the said mechanical parts in this instance being supported by means of supporting posts 14 which are mounted on the plate-like member 11 of the unit B.

Connected with the plate-like member 12 is a mounting member 15, which is sealed in airtight engagement as at 16 with the plate-like member 12. Moreover, in this instance also the mounting member 15 is provided with an orifice 17 which communicates with the interior of the unit B or, in other words, the chamber formed between the diaphragm 10 and plate-like member 12. The mounting member is provided with screw threaded orifices 18, one of which is illustrated in Fig. 1 and rests upon the bottom 19 of the casing A with a sealing gasket 20 interposed therebetween.

On the outside of the casing A I employ a securing member in the form of a plate-like member 21, having a bearing surface of substantial area which is designed to bear upon the exterior of the casing and, in fact, upon the exterior of that wall of the casing against which the mounting member 15 bears through its gasket 20. Preferably this exterior wall of the casing is recessed as at 23 over an area substantially corresponding in size and shape to the securing member 21 so that the latter may be disposed in the recess and its exterior surface disposed mainly to lie flush with the remainder of the exterior surface of the side wall. A gasket 24 is disposed between securing member 21 and the wall of the casing on which it is mounted so as to form an airtight fitting.

The mounting member 15 and securing member 21 through their gaskets are forced into tight engagement with this wall of the casing by means of screws or the like 25 which draw these members towards each other and subject the wall of the casing therebetween to a compressive stress distributed over the area of these members which is readily withstood by material of the kind in question in contradistinction to its tendency to fracture under a tension stress.

Figure 3:
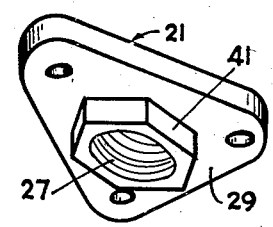
Fig. 3 is a perspective view of one form of securing member.

In order to permit access from the exterior of the casing to part of the mechanism therewithin, the casing wall is orificed as at 26 to register with the opening 27 in the securing member 24. Where it is also desired to have access to the interior of the casing apart from the opening 26, a further opening 28 may be provided in the wall of the casing. In the case where but one opening 26 is provided the securing member 21 may take the form of a simple plate-like member 29 shown in Fig. 3, triangular in form. Where, however, an additional opening 28 is provided in the casing wall the securing member 21 may take the form of the plate-like member 30, Fig. 4, which is also illustrated in cross section in Fig. 1. In this instance the member 30 is provided with an opening 31 which is designed to register with the opening 28 in the casing.

Figure 6:
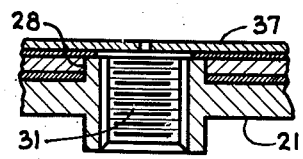
Fig. 6 is a fragmentary sectional view of an alternative mode of associating the securing member with the base of a casing.
Figure 5:
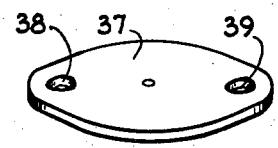
Fig. 5 is a perspective view of a form of clamping plate that may be employed.

It is preferred in either form of securing member to provide on its inner bearing surface, surrounding the opening 27 or the openings 27 and 31, as the case may be, an inwardly projecting boss indicated at 32 in the case of the opening 27 and at 33 in the case of the opening 31. In this connection the orifices 26 and/or 28 in the casing wall may be made large enough so that the bosses 32 and/or 33 may project therein as shown in Fig. 6. On the other hand, it is preferred, as illustrated in Fig. 1, to employ orifices 26 and/or 28 of a size substantially to correspond with the openings 27 and/or 31 in the securing member 24 and to recess the wall of the casing as at 34 surrounding the openings 25 and/or 28 so that the bosses 32 and/or 33 may fit within such recess. This provides a larger area against which the securing member 24 may bear. Moreover, it provides a greater amount of material in this wall surrounding the openings through which the screws 25 project and, therefore, provides a structure of substantial strength. Finally, by providing the projecting bosses 32 and/or 33 which project either through the orifices 26 and/or 28 or into the recesses 34 surrounding these orifices, it is possible to confine any stresses, transmitted by the securing member to the casing, to simple stress transmitted through the whole thickness of the casing wall and parallel to its plane, as will be referred to hereinafter.

Figure 4:
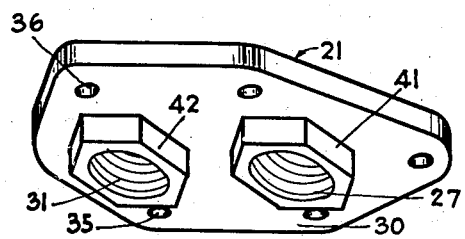
Fig. 4 is a perspective view of another form of securing member.

In the case where a composite fitting 21 is provided such as shown in Fig. 4, extra orifices 35 and 36 are provided for the passage of securing screws 25 and on the inside of the casing wall a clamping plate 37 is provided, preferably elliptical in form, to fit in the casing beside the mounting member 15, the clamping plate being provided with the orifices 38 and 39 to register with the orifices 35 and 36 of the securing member 21 and to register with suitable orifices in the intervening casing wall. In such a form of construction the gasket 20 is preferably laterally extended so that the extension 40 extends between the clamping plate 37 and the inner surface of the wall of the casing. The clamping plate receives the screws 25 and the intervening portion of the casing wall is subjected to a compressive stress. In this way the securing member 21 provides for the firm mounting of the mechanism in the casing in contradistinction to prior practice wherein parts of the mechanism which were not connected with the imbedded bushing were fastened by screws or the like, merely passing through the wall of the casing and retained by lock washers which, owing to the nature of the material of the casing, could not practicably perform their locking function and consequently worked loose.

A further feature of the construction resides in the cooperation of the securing member with the casing through its mounting in the recess 23 so that any stresses that may be transmitted to the casing will be directed in a predetermined manner. In this connection the securing member and the recess substantially coincide in size. Therefore, in the case where the securing member 21 is subjected to laterally directed pressure such as might be the case in connecting accessories thereto, the side edges of the connecting member engaging the side walls and the recess 23 would subject the walls to a stress parallel to the plane of the wall which in the majority of cases will be absorbed by the wall and will not result in fracture. Moreover, due to the provision of the bosses 32 and 33 as previously referred to, and the fact that they project through the orifices 26 and/or 28 or into the recess surrounding such orifice or orifices and which extend through the wall substantially to its inner surface, such stress is transmitted through or substantially through the whole thickness of the wall. Consequently such stress is confined to a simple stress directed in a plane parallel to the plane of the wall and distributed over a substantial area. Thus, having regard to the character of the mounting means, area of the main parts and their assembly, it will be appreciated that the wall cannot be subjected to compound tension stress as is the case where an imbedded bushing is employed and which presents the greatest hazard in respect to the fracture of the frangible casings of instruments, previously referred to.

Preferably I provide on the outer face of the securing member 21 surrounding the opening 27 a boss 41, the sides of which are flattened so as to form in effect a construction similar to a conventional nut. Likewise in the case of a securing member of the general kind indicated by the numeral 30 in Fig. 4 and having a second opening such as 31, I form on the exterior surface of the securing member a boss 42 formed similarly to the boss 41. This provides on the securing member a means for gripping the securing member by means of a wrench or the like so that where a tube or other fitting is being secured within the opening or openings, as the case may be, the securing member can be held easily while the fitting is being secured in the opening, avoiding the remotest possibility of tension stress being transmitted to the casing while tightening such fitting in the opening. In this way, therefore, I avoid subjecting the frangible casing even to the smallest degree of tension stress which might cause it to fracture.

By this simple construction I avoid the possibility of fracture of the frangible casing which has been a disadvantage in prior constructions in which fracture of the casing has been a frequent occurrence and I provide a simple and compact mounting. In the case particularly of instruments of the specific kind illustrated, an extremely compact and efficient mounting is provided as the instrument mechanism, including the mounting member 12, may be set in the casing as a complete unit so that, apart from the gaskets necessary for sealing, there are only three distinct parts in the assembly of the instrument in the casing, viz., the instrument mechanism including the attached mounting member 15, the securing member 21 and the casing.

What I claim as my invention is:

1. In an instrument of the type operated by fluid pressure, means for mounting said instrument comprising a diaphragm unit, supporting means rising therefrom, instrument mechanism carried by the supporting means, and a mounting member secured to said unit, all forming a general assembly insertable in a casing as a whole, said mounting member being designed to rest upon the interior surface of a wall of the casing, and a securing member having a bearing surface of substantial area and designed to bear against the exterior surface of said wall over an area substantially corresponding to but opposite to that engaged by the mounting member, and connecting means extending through said wall between the securing member and mounting member and clamping said assembly to the wall, said securing member, casing wall and mounting element being provided with apertures in registration affording communication from the exterior to the interior of the casing.

2. In an instrument of the type operated by fluid pressure, means for mounting said instrument comprising a diaphragm unit, supporting means rising therefrom, instrument mechanism carried by the supporting means, and a mounting member secured to said unit, all forming a general assembly insertable in a casing as a whole, said mounting member being designed to rest upon the interior surface of a wall of the casing, and a securing member having a bearing surface of substantial area and designed to bear against the exterior surface of said wall over an area substantially corresponding to but opposite to that engaged by the mounting member, said wall being recessed inwardly from the outside to receive the securing member, the contour of said recess corresponding with the contour of the securing member, the periphery of which substantially abuts the side walls of the recess and said mounting member, casing wall and securing member having means providing a passage establishing communication between the diaphragm unit and the exterior.

3. In an instrument of the character described, the combination of a casing of frangible material of less resistance to tensile stress and designed to encase the instrument mechanism, of mounting means connected with said mechanism for mounting the latter on a wall of the casing inside thereof and a securing member having a bearing surface of substantial area designed for bearing engagement with the outside of said wall and disposed over an area thereof partially corresponding to but opposite to that engaging said mounting means, said securing member being extended to project along said exterior wall beyond the area thereof engaged by said mounting means, a clamping plate disposed on the interior of said wall over an area substantially corresponding to that engaged by the extension of said securing member and connecting means extending through said wall between the mounting means, clamping plate and the securing member subjecting said wall to compressed stress only and completely distributed over a substantial area of the wall, said securing member, casing wall and mounting means being provided with aligned apertures affording access into the interior of the casing, and said securing member, casing wall and clamping plate also being provided with aligned apertures affording access into the interior of the casing.

4. Means for mounting an instrument in a frangible casing of non-metallic material of low resistance to tensile stresses, comprising a mounting element connected with the instrument and having a flat bearing surface in abutting engagement with the inside surface of a wall of the casing, and a securing member having a flat bearing surface in abutting engagement with the outside surface of the said wall of the casing in an area substantially underlying and at least coextensive with the area of said mounting element, clamping means passing through said wall and extending between said mounting element and securing member and clamping the casing wall therebetween, said securing member, casing wall and mounting element being provided with apertures in registration affording communication from the exterior to the interior of the casing.

5. In an instrument of the character described, the combination with a casing of frangible material of low resistance to tensile stress and designed to encase the instrument mechanism, of mounting means connected with said mechanism for mounting the latter on a wall of the casing inside thereof, and a securing member having a bearing surface of substantial area designed for bearing engagement with the outside of said wall and disposed over an area thereof substantially corresponding to but opposite to that engaging said mounting means, and connecting means extending through said wall between the mounting means and the securing member subjecting said wall to compressive stress only and equally distributed over a substantial area of the wall, said wall being orificed, said securing member being provided with an opening designed to register with the orifice in said wall, the exterior wall of the casing surrounding said orifice being recessed inwardly, said securing member being provided with a projecting boss surrounding its said opening and designed to fit in said recess, and said mounting means being provided with an orifice in register with the orifice in the wall of the casing.

RIFAT AVIGDOR.